United States Patent [19]

Chang et al.

[11] Patent Number: 4,732,929
[45] Date of Patent: Mar. 22, 1988

[54] SILICON-CONTAINING POLYOLS

[75] Inventors: Wen-Hsuan Chang; David T. McKeough, both of Gibsonia; John R. Peffer, Pittsburgh, all of Pa.

[73] Assignee: PPG Industries, Inc., Pittsburgh, Pa.

[21] Appl. No.: 19,917

[22] Filed: Feb. 27, 1987

Related U.S. Application Data

[63] Continuation-in-part of Ser. No. 462,159, Jan. 31, 1983, abandoned.

[51] Int. Cl.$^4$ .................. C08G 77/04; C08L 83/00
[52] U.S. Cl. ........................ 524/541; 524/100; 524/500; 524/506; 524/542; 524/783; 524/859; 524/861; 524/862; 524/864; 528/26; 528/28; 528/29; 528/34
[58] Field of Search ............... 524/100, 783, 859, 861, 524/862, 864, 506, 500, 541, 542; 528/26, 28, 29, 34

[56] References Cited

U.S. PATENT DOCUMENTS 3,932,339  1/1976  McLeod .......................... 106/14.44
4,413,086  11/1983  Chang et al. ...................... 524/506

Primary Examiner—Herbert J. Lilling
Attorney, Agent, or Firm—Thomas M. Breininger

[57] ABSTRACT

Disclosed are essentially zinc-free, organic coating compositions based on silicon-containing polyols comprising reaction products of hydrophobic polyols, organosilicon-containing materials, and higher monohydric alcohols, R-OH. The organosilicon-containing material comprises an organosilicon-containing substance free of certain functional groups attached directly to carbon and essentially free of alkali metal ions. The organosilicon-containing substance has atoms bonded directly to Si all of which are selected from O, N, and/or Cl. The organosilicon-containing substance also has moieties directly bonded to Si which are displaceable by reaction with water and/or alcohol. The reaction product is not capable of being gelled when subjected to a specific gel test, has a content of hydroxyl groups from the hydrophobic polyol ranging from 0.4 to 10 milliequivalents per gram of reaction product, has a content of groups, —OR, from the higher monofunctional alcohol ranging from 0.1 to 7 milliequivalents per gram of reaction product, and a content of the moieties directly bonded to Si which are displaceable of less than 1 milliequivalent per gram of reaction product.

The organic coating composition also contains a curing agent for for the silicon-containing polyol selected from the group consisting of an aminoplast, a phenoplast, an isocyanate, a blocked isocyanate, a semi-blocked isocyanate, a lower-alkoxy-containing silane, and a hydrolyzed lower- alkoxy-containing silane.

The coating composition is essentially free of elemental zinc and cures to an essentially organic coating.

17 Claims, No Drawings

SILICON-CONTAINING POLYOLS

This application is a continuation-in-part of application Ser. No. 462,159, filed Jan. 31, 1983, and now abandoned.

BACKGROUND OF THE INVENTION

Given the concern over the possible harmful effects of high concentrations of various volatile organic solvents in the environment, the prevailing high cost of energy in general, and the increasing cost and scarcity of petroleum based energy sources in particular, there has arisen a need in the coatings industry for coating compositions which contain ever lower concentrations of volatile organic materials and which are based to an ever decreasing degree on expensive petroleum based components.

However, previous approaches to meet all three of the above challenges generally have involved compromises among desirable coating composition parameters such as high molecular weight of the principal film forming components, viscosity of the principal film-forming resin, application viscosity of the coating composition, low curing temperature, and desirable properties of the cured film such as water and humidity resistance, solvent resistance, hardness, flexibility, etc.

It would be desirable to produce coating compositions which contain low levels of volatile organic solvents, have low application viscosities, contain less petroleum based components, and yet cure to produce films having desirable features.

In general, most known polyols useful in coating formulations are derived in largest measure from petroleum based components. Additionally, as the molecular weight of generally available polyols increases, the viscosity also tends to rapidly increase. High viscosity of the principal film forming components represents a very real limitation on the usefulness of such components in high solids coating formulations. The present invention is directed to providing novel polyols and coating compositions containing these polyols in which a number of the above problems are lessened.

DESCRIPTION OF PRIOR ART

U.S. Pat. No. 3,932,339 to McLeod is directed to compositions which are particularly useful in coatings that can provide galvanic protection when cured on a ferrous substrate. The binders for the compositions of the reference are ester-exchange reaction products made from polyol (primarily a hydrophilic polyol) and organic orthosilicate.

It was generally known in the art of zinc-rich coatings that coatings for providing galvanic protection to ferrous substrates could be made by combining finely divided zinc with monomeric orthosilicates, or hydrolyzed and condensed orthosilicates, containing hydrolyzable groups such as methoxysilyl and ethoxysilyl which could be cured in the presence of moisture with the release of the corresponding alcohol to form an essentially inorganic crosslinked coating. See, for example, column 2, line 43 through column 4, line 9 of the '339 patent itself. The organosilicate binders were not themselves film-formers per se because of hydrolysis to silica, but could be combined with zinc and moisture-cured to form a zinc-rich coating. However, both the combination of the zinc with the organosilicate binder, and the binder without the zinc, were subject to a very limited potlife because of the inherent instability of the composition formed by combining the zinc with the binder, and also because of the instability of the binder itself, when in the presence of moisture. The '339 patent essentially is addressed to solving this inherent instability problem by reacting primarily hydrophilic glycols such as ethylene glycol, with the organosilicate to make a type of polyol silicate binder which would be more package stable itself, and more package stable in the presence of zinc, than the previous art known compositions utilized for zinc-rich coatings applications.

The coatings disclosed in the '339 patent are coatings for providing galvanic protection to a metal substrate. The coatings contain as essential ingredients solvent soluble, aliphatic-polyol-derived silicate (hereinafter sometimes referred to as 'polyol silicate') and metallic zinc filler in finely divided form. The only other type of compositions for which the polyol silicates of the '339 patent are suggested as useful are ceramic molding compositions containing the various fillers disclosed in the '339 patent with or without metallic zinc. Both the zinc-rich compositions to which the '339 patent is essentially directed and the ceramic molding compositions referred to therein are compositions which cure to essentially inorganic materials. When coatings are more specifically referred to in the '339 patent, they are zinc-rich coatings prepared from finely divided zinc and the polyol silicates disclosed therein.

The '339 patent teaches that the zinc-rich compositions of the reference cure to substantially inorganic zinc-silicate type materials wherein the organic portion from the polyol silicate essentially leaves the composition as it cures to provide a zinc silicate type material. Noteworthy in this regard is column 6, lines 7–13 of the '339 patent which teaches that, "The exceptional heat resistance of my composition is believed to be due to the driving-off by evaporation on exposure to air and moisture of all organic groups to leave the inorganic grouping—$SiO_2$, ZnO, $SiO_2$—, zinc silicate and possibly zinc oxychloride, which is stable up to red heat temperatures, such as 1100° to 1200° F." The polyol portion of the polyol silicate binder is not taught in the 339 patent to remain in the resulting zinc-rich coating when a zinc-rich coating composition is cured; but rather it is taught therein that the organic portion escapes from the composition as it is cured. This is consistent with the clear teaching in the '339 patent that polyols such as ethylene glycol, propylene glycol and glycerol are the preferred polyols, ethylene glycol being "most highly preferred". These are low molecular weight, hydrophilic polyols suitable for volatilizing from a zinc-rich composition upon curing.

In contrast, the present invention is directed to an organic coating composition, free of elemental zinc, which cures to an organic film and which is based on a silicon-containing polyol prepared from a hydrophobic organic polyol and a higher monofunctional alcohol as discussed infra. The use of a hydrophobic organic polyol in the preparation of the silicon-containing polyol enhances the hydrolytic stability of the carbon to oxygen to silicon linkage which is believed to contribute to the resistance of a cured coating of the present invention to degradation by water either in the form of liquid water or water vapor. Moreover, the presence of the moiety, —OR, from the higher monofunctional alcohol, in the silicon-containing polyol also provides enhanced hydrolytic stability to a cured film prepared from such a silicon-containing polyol. Such a silicon-containing polyol when cured, for example with an appropriate hydroxyl-reactive curing agent, provides a durable, protective, organic film incorporating the residue of the silicon-containing polyol, i.e., from the hydrophobic polyol and the higher monofunctional alcohol.

SUMMARY OF THE PRESENT INVENTION

A coating composition of the present invention comprises a reaction product, hereinafter referred to as a silicon-containing polyol, prepared by reacting (A) a hydrophobic polyol, (B) an organosilicon-containing material containing at least one organosilicon-containing substance, and (C) a higher monofunctional alcohol corresponding to the formula ROH wherein R represents alkyl of at least 4 carbon atoms, aryl, alkylaryl, arylalkyl, alkyloxyalkyl, or aryloxyalkyl. The organosilicon-containing substance is free of functional groups attached directly to carbon and is essentially free of alkali metal ions. The organosilicon-containing substance has atoms directly bonded to silicon all of which are selected from the group consisting of O, N, Cl and combinations thereof. The organosilicon-containing substance additionally has moieties directly bonded to Si which are displaceable by reaction with water and/or alcohol. Optionally, at least a part of the organosilicon-containing substance is hydrolyzed. Generally, such hydrolyzed organosilicon-containing substances will be at least partially condensed to a compound or mixture of compounds containing at least one siloxane linkage per molecule and containing a residual amount of the moieties directly bonded to silicon which are displaceable by reaction with water and/or alcohol.

The reaction product of hydrophobic polyol, organosilicon-containing material, and higher monofunctional alcohol has a content of hydroxyl groups from the polyol ranging from 0.4 to 10, preferably from 0.7 to 7, and most preferably from 1.3 to 6 milliequivalents per gram of the reaction product, has a content of groups, RO—, from the higher monofunctional alcohol ranging from 0.1 to 7, preferably from 0.2 to 6, and most preferably from 0.7 to 4.5 milliequivalents per gram of the reaction product, and has a content of the moieties directly bonded to Si which are displaceable by reaction with water and/or alcohol of less than 1 milliequivalent per gram of reaction product. The reaction product is not capable of being gelled when subjected to a specific three-step gel test disclosed infra.

A coating composition of the present invention also comprises a a curing agent such as an aminoplast, a phenoplast, an organic isocyanate, a blocked or semiblocked organic isocyanate, a lower-alkoxy-containing silane or a hydrolyzed lower-alkoxy-containing silane, and the reaction products prepared from organosilicon-containing materials and hydrophobic polyols which reaction products are the subjects of applicants' U.S. Pat. Nos. 4,467,081, 4,501,872 and 4,446,292, all three of said patents having been filed on the same date as the parent of the present application, the disclosures of which patents are hereby incorporated by reference in their entireties.

A coating composition of the invention is essentially free and typically completely free of elemental zinc and cures to an essentially organic coating.

DETAILED DESCRIPTION OF THE INVENTION

An organic coating composition of the present invention comprises:
I. a silicon-containing polyol comprising a reaction product prepared by reacting:
 (A) at least one hydrophobic polyol;
 (B) an organosilicon-containing material comprising
  (1) at least one organosilicon-containing substance free of functional groups attached directly to carbon and essentially free of alkali metal ions, having atoms bonded directly to Si, all of said atoms being selected from the group consisting of O, N, Cl and combinations thereof, said organosilicon-containing substance additionally having moieties directly bonded to Si which are displaceable by reaction with water and/or alcohol, wherein, optionally, at least a part of said organosilicon-containing substance is hydrolyzed to a compound or a mixture of compounds, said compound or mixture of compounds containing a residual amount of said moieties directly bonded to Si which are displaceable;
  (2) optionally a nonfunctional organosilane, a hydrolyzed nonfunctional organosilane, or a mixture thereof; and
  (3) optionally a functional organosilane, a hydrolyzed functional organosilane or a mixture thereof; and
 (C) at least one higher monofunctional alcohol corresponding to the formula R—OH wherein R represents alkyl of at least 4 carbon atoms, aryl, alkylaryl, arylalkyl, alkyloxyalkyl, or aryloxyalkyl;
 wherein said reaction product has a content of hydroxyl groups from said polyol ranging from 0.4 to 10 milliequivalents per gram of said reaction product, has a content of groups RO— from said higher monofunctional alcohol ranging from 0.1 to 7 milliequivalents per gram of said reaction product, has a content of said moieties directly bonded to Si which are displaceable of less than 1 milliequivalent per gram of said reaction product and remains ungelled when subjected to a two-step gel test consisting of (1) heating a 10 gram sample of said reaction product at 177° C. for 240 minutes in a glass jar covered by a piece of masking tape, followed by repeating step 1 in the presence of 0.5 grams of stannous octoate; and
II. a curing agent for said silicon-containing polyol; wherein said coating composition is essentially free of elemental zinc and cures to an essentially organic coating.

Additionally, the reaction product preferably has a low volatility and low viscosity.

Organic polyols suitable for preparing the silicon-containing polyols are hydrophobic polyols typically having a hydroxyl equivalent weight of from 45 to 1000, preferably of from 59 to 600. Typically the hydroxyl equivalent weight of polyols used to prepare the silicon-containing polyols suitable for high solids coating compositions of the invention ranges from 59 to 500, preferably from 70 to 300. Diols are preferred for the hydrophobic polyol component for forming the silicon-containing polyols. Preferably, at least a part of the polyol contains nonvicinal hydroxyl groups, that is hydroxyl groups which are bonded to carbon atoms which are separated from each other by at least 1 intervening carbon atom. A large amount of high molecular weight 1,2-glycols generally is undesirable in polyols used to prepare the silicon-containing polyols since the high molecular weight 1,2-glycols are believed to contribute to the formation of a high yield of cyclic moieties in the the silicon-containing polyols prepared therefrom which may decrease the performance properties of coating compositions containing these silicon-containing polyols possibly because of a decreased amount of residue of the organosilicon-containing material being incorporated in the cured film.

A large amount of low molecular weight 1,2-glycols, such as ethylene glycol and propylene glycol, also is undesirable since such glycols tend to volatilize during cure and tend to decrease cure response and may prevent the formation of a continuous, water resistant film from a coating composition if no hydrophobic polyol is present in the the silicon-containing polyol. Additionally, polyols containing hydroxyl moieties separated from each other by only three carbon atoms are also undesirable for similar reasons.

The term "hydrophobic polyol" is intended to mean an organic polyol having limited compatibility with water as determined by the following procedure. Thirty parts by weight of polyol and 70 parts by weight of water are thoroughly mixed together at 80° Celsius (°C.) for 5 minutes. Upon cooling to room temperature, if the polyol/water mixture separates into two phases, the polyol is considered herein to be a hydrophobic polyol useful for the preparation of the silicon-containing polyols. Polyols such as ethylene glycol when mixed with water according to the above procedure for determining hydrophobic polyols produce a homogeneous (i.e. single phase) mixture and are considered herein to be hydrophilic. Pure hydrophilic polyols are not desirable for preparation of the silicon-containing polyols because the resultant reaction product will disadvantageously degrade either during curing or as a cured film either by evaporation or by hydrolysis to produce $SiO_2$. Thus, for example, such hydrophilic polyols often will not permit continuous films to be formed when resins prepared from such polyols are cured.

An advantage of using hydrophobic polyols in the preparation of the silicon-containing polyols is that they enhance the hydrolytic stability of the carbon to oxygen to silicon bond

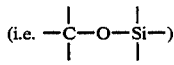

formed by the reaction of the hydroxyl moiety on the polyol with a reactive moiety on the organosilicon-containing material, typically a lower alkoxy moiety on the organosilicon-containing material. Hydrolytic stability of the aforementioned carbon to oxygen to silicon bond is believed to contribute to the resistance of cured coatings of the invention prepared from the silicon-containing polyols to degradation by water either in the form of liquid water or water vapor. Cured coatings of the invention prepared from the silicon-containing polyols generally have excellent humidity resistance. It is also believed that the utilization of hydrophobic polyols enables the silicon-containing polyol, for example, when reacted with an appropriate curing agent, to provide durable, protective, cured films incorporating the residue of the silicon-containing polyol. This is to be contrasted with silicate-containing resins based on hydrophilic polyols, for example, ethylene glycol for which the organic portion essentially leaves the film when the resin is thermally cured.

Thus a polyol, such as ethylene glycol, which is hydrophilic, has 1,2-glycol groups, is highly volatile, and can be considered to be a leaving group, represents a polyol having a combination of very undesirable properties which make the use of significant amounts of such polyol undesirable for making the silicon-containing polyol. A significant amount of ethylene glycol, for example, would represent more than 50 percent by weight of the polyol, component (A). However, when a polyol such as ethylene glycol is employed in the invention, preferably less than 30 percent of such polyol should be used in preparing the silicon-containing polyol.

Examples of polyols useful in the preparation of the reaction products include the hydrophobic polyols in the broad classes including: simple diols, triols, and higher hydric alcohols; polyester polyols; polyether polyols; amide containing polyols; and polyurethane polyols.

The simple diols, triols, and higher hydric alcohols useful in the preparation of the reaction products are generally known, examples of which include: 1,2-butanediol, 1,4-butanediol; 1,3-butanediol, 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis (hydroxymethyl) cyclohexane; 1,2-bis (hydroxyethyl) cyclohexane; 2,2-dimethyl-3-hydroxypropyl-2,2-dimethyl-3-hydroxypropionate; dipropylene glycol; the alkoxylation product of 1 mole of 2,2-bis (4-hydroxyphenyl) propane (i.e., bisphenol-A) and 2 moles of propylene oxide available as DOW-565 from DOW CHEMICAL COMPANY; and the like. Of the above simple diols, triols, and higher hydric alcohols, less desirable are dipropylene-glycol and 1,3 type diols such as 1,3-butanediol, 2,2,4-trimethyl-1,3-pentanediol, 2,4-pentanediol, 2-methyl-1,3-pentanediol, 2-methyl-2,4-pentanediol, 2,4-heptanediol, 2-ethyl-1,3-hexanediol, and 2,2-dimethyl-1,3-propanediol when employed as the sole polyol component because of the tendency of some of these diols to form cyclic moieties during reaction with the organosilicon-containing material and because some of these diols are on the borderline of being hydrophilic as determined by the test for hydrophobicity described above.

Hydrophobic polyester polyols useful in the preparation of the reaction products are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids, optionally polycarboxylic acids essentially free of ethylenic unsaturation. As used herein, the phrase "polycarboxylic acids essentially free of ethylenic unsaturation" is intended to include acids containing aromatic unsaturation but essentially no ethylenic unsaturation. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid;

maleic acid; glutaric acid; malonic acid; pimelic acid; suberic acid; 2,2-dimethyl-succinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxy caproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols useful in the invention are understood to include polyester polyols modified with fatty acids or glyceride oils of fatty acids (i.e., conventional alkyd polyols containing such modification). A preferred way of making a polyester polyol suitable for the invention is to react an alkylene oxide such as ethylene oxide, propylene oxide, butylglycidyl ether, and the glycidyl esters of organic acids such as CARDURA-E, with the carboxylic acid to form the corresponding ester. By this method, there are essentially no vicinal hydroxyl groups in the resulting polyol product.

Examples of the optional monohydric alcohols which may be used to prepare the polyester polyols include: ethanol, propanol, isopropanol, n-pentanol; neopentyl alcohol; 2-ethoxyethanol, 2-methoxyethanol 1-hexanol; cyclohexanol; 2-methyl-2-hexanol; 2-ethylhexyl alcohol; 1-octanol, 2-octanol, 1-nonanol; 5-butyl-5-nonanol, isodecyl alcohol, trimethylolpropane diallyl ether and the like. Usually, the hydrophobic properties of the silicon-containing polyol can be enhanced by employing monoalcohols containing more than 4 carbon atoms.

Hydrophobic polyether polyols which may be used in the preparation of the reaction products are generally known. Examples of hydrophobic polyether polyols include the poly-(oxypropylene) glycols prepared by the acid or base catalyzed addition of propylene oxide to propylene glycol or dipropylene glycol initiators and by the copolymerization of propylene oxide and ethylene oxide with initiator compounds such as trimethylolpropane, glycerol, pentaerythritol, sorbitol, sucrose and the like. The hydrophobic polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of hydrophobic polyether polyols include the generally known reaction products of 1,2-epoxide-containing compounds with polyols such as those included in the description of simple diols, triols, and higher hydric alcohols above.

Hydrophobic amide-containing polyols are generally known and typically are prepared from any of the above-described diacids or lactones and diols, triols and higher alcohols, and diamines or aminoalchols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine ethylenediamine, phenylenediamines, toluenediamines, monoethanolamine, diethanolamine, N-methyl-monoethanolamine, isophorone diamine, 1,8-menthanediamine and the like.

Hydrophobic polyurethane polyols are generally known. Polyurethane polyols useful in the present invention can be produced by reacting any of the above-described polyols, including diols, triols, and higher alcohols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate terminated prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. In general, urethane formation improves the hydrophobicity of polyols.

The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2-4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyante; lysine methyl ester diisocyanate; bis (isocyanatoethyl) fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the polyisocyanate for preparing the hydrophobic polyurethane polyols.

Hydrophobic polyester polyols that are alkyd polyols which may be used in the preparation of the silicon-containing reaction products are generally known. As used herein, the term "alkyd polyols", refers to alkyd resins containing hydroxyl functionality. They typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd resins are well-known generally. Usually, the process involves reacting together the polycarboxylic acid and fatty acid or a partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyd polyols include the simple diols, triols, and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing the hydrophobic polyester polyol oligomers. Examples of suitable fatty acids include saturated and unsaturated acids such as stearic acid, oleic acid, ricinoleic acid, palmitic acid, linoleic acid, linolenic acid, licanic acid, eleostearic acid, clupanodonic acid and mixtures thereof. The fatty acids may be in the form of the free acids with sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd polyol.

As stated previously, the hydrophobic polyol; organosilicon-containing material comprising an organosilicon-containing substance (defined herein), optionally a nonfunctional organosilane (defined herein), and optionally a functional organosilane (defined herein); and higher monofunctional alcohol are reacted to form the silicon-containing polyol. The organosilicon-containing materials employed to produce the reaction products in some cases are incompatible with the hydrophobic polyol. An organosilicon-containing material which is incompatible with a hydrophobic polyol, when mixed at room temperature with the polyol, separates into layers. Therefore, it is necessary to react the hydrophobic polyol and the organosilicon-containing material to produce a homogeneous product.

The organosilicon-containing substance required in the organosilicon-containing material is defined as follows. A useful organosilicon-containing substance is organic and is essentially free of alkali metal ions which distinguish it from generally known inorganic silicates such as alkali metal silicates including, for example, sodium orthosilicate. All atoms bonded directly to Si in the organosilicon-containing substance are selected from oxygen, nitrogen and/or chlorine, preferably oxygen and/or nitrogen, most preferably all of such atoms being oxygen. Thus, silicon in the organosilicon-containing substance will be bonded to atoms other than O and/or N, such as C or another Si atom, through the O or N atoms. The organosilicon-containing substance additionally has moieties directly bonded to Si which are displaceable by reaction with water and/or alcohol. Examples of moieties directly bonded to Si which are displaceable by reaction with water or alcohol include —OR¹, $$-O-\overset{O}{\underset{\|}{C}}-R^2, -\overset{H}{\underset{|}{N}}-\overset{O}{\underset{\|}{C}}-R^2, -O-N=\overset{R^3}{\underset{|}{C}}-R^4, \text{ and}$$

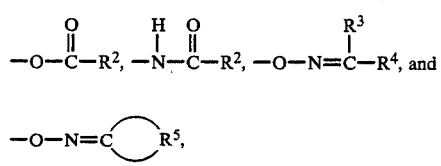

and the $C_2$ to $C_3$ residue of a 1,2-or 1,3-glycol, wherein
$R^1$ represents $C_1$-$C_3$ alkyl,
$R^2$ represents H or $C_1$-$C_4$ alkyl,
$R^3$ and $R^4$ independently represent H, $C_1$-$C_4$ alkyl, $C_6$-$C_8$ cycloalkyl, or $C_6$-$C_8$ aryl, and
$R^5$ represents $C_4$-$C_7$ alkylene.

Preferably all of the moieties directly bonded to Si which are displaceable by reaction with water and/or alcohol are easily displaceable lower alkoxy moieties selected from the group consisting of methoxy, ethoxy, and propoxy. It will be appreciated that the oxygen atom in, for example, an ethoxy moiety attached to Si of course serves as an atom bonded directly to Si selected from O, N, and/or Cl as discussed above. Optionally, at least a part of the organosilicon-containing substance is hydrolyzed, or hydrolyzed and at least partially condensed to a compound or a mixture of compounds containing at least one siloxane linkage

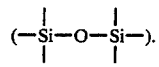

It is also to be understood that useful organosilicon-containing substances having atoms bonded directly to Si selected from O, N, and/or Cl are essentially free of functional groups directly attached to carbon atoms, examples of which groups include isocyanate, epoxy, amino, etc. As will be apparent, the previously described moieties bonded directly to Si which are easily displaceable by reaction with water or alcohol do not fall into the category of functional groups referred to in the immediately preceding sentence.

The silicon-containing polyol contains moieties, RO—, as discussed previously, from the higher monofunctional alcohol. These moieties RO— from the higher monofunctional alcohol are selected from the group consisting of alkoxy containing at least 4 carbon atoms (i.e., higher alkoxy), aryloxy, alkylaryloxy, arylalkyloxy, alkyloxyalkyloxy, and/or aryloxyalkyloxy. Examples of such moieties include n-butoxy, isobutoxy, secondary-butoxy, tertiary-butoxy, n-pentoxy, isopentoxy, neopentoxy, hexoxy, nonoxy, isodecyloxy, phenoxy, benzyloxy, phenylethoxy, tolyloxy, xylyloxy, 4-ethylphenoxy, phenoxy- ethoxy, 2-butoxyathoxy, and the like. The presence of such higher alkoxy, aryloxy, arylalkyloxy, alkylaryloxy, alkyloxyalkyloxy, and/or aryloxyalkyloxy moieties in silicon-containing polyols provide enhanced hydrolytic stability to cured films prepared from the silicon-containing polyols. Of the higher mono-functional alcohols which provide higher alkoxy moieties, particularly preferred are the higher mono-functional alcohols containing moieties, RO—, wherein R represents a branched hydrocarbon group containing at least 4 carbon atoms because such moieties contribute to particularly enhanced hydrolytic stability of the

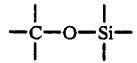

linkage derived from reaction of the hydrophobic polyol with the organosilicon-containing material in silicon-containing polyols prepared from such monofunctional alcohols.

By way of illustration, an especially desirable class of organosilicon-containing substances suitable in the invention include organosilicates which, prior to optional hydrolysis, correspond to the following formula, I,

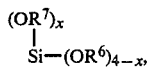 (I)

wherein
R[6] represents methyl, ethyl or propyl,
R[7] represents alkyl containing at least 4 carbon atoms, aryl alkylaryl, arylalkyl, aryloxyalkyl, or alkyloxyalkyl, and
x is an integer ranging from 0 to 3, preferably 0 or 1, and most preferably 0.

Examples of useful organosilicates include: tetramethoxysilane, tetra-ethoxysilane, tetra-n-propoxysilane, methoxytriethoxysilane, dimethoxydiethoxysilane, trimethoxy-n-propoxysilane, bis(2-ethylhexoxy)diethoxysilane, butoxytriethoxysilane, and the like. Mixtures of organosilicates also may be used as the organosilicon-containing substance. When organosilicates containing groups —OR[7] (defined in formula I) are utilized to prepare the silicon-containing polyols, such organosilicates generally contain at least 5 percent, preferably at least 15 percent, by weight, of the moieties —OR[7].

Of the organosilicates corresponding to the formula I, above, the tetraalkoxysilanes wherein x equals 0 in formula I are preferred. The tetraalkoxysilanes enhance the ease with which the silicon-containing polyols can be prepared. Additionally, the tetraalkoxy-silanes are readily available at low cost. Furthermore, they can be used to attach the modifying groups represented by —OR[7] in formula I above.

Of the examples of organosilicates described above, tetramethoxysilane is desirable for some purposes because of the ease with which it reacts with the hydroxyl moiety of the hydrophobic polyol and/or the higher monohydric alcohol. Tetraethoxysilane is especially desirable since, although tetraethoxysilane is not as reactive as tetramethoxysilane, it does not provide the possibility of toxicity problems that may be encountered with the use of tetramethoxysilane and is not as highly volatile as tetramethoxysilane.

Additional examples of organosilicates include pentoxytrimethoxysilane, isopentoxytrimethoxysilane, neopentoxytrimethoxysilane, neopentoxytriethoxysilane, 2-ethyl-2-hexoxytriethoxysilane, 2-methyl-2-butoxytriethoxysilane, dipentoxydiethoxysilane, diisopentoxydiethoxysilane, di(2-ethyl-2-hexoxy) diethoxysilane, di(2-methyl-2-hexoxy) diethoxysilane, octanoxytrimethoxysilane, octanoxytriethoxysilane, isodecyloxytriethoxysilane, diisodecyloxydiethoxysilane, ethoxytripentoxysilane, phenoxytrimethoxysilane, phenoxytriethoxysilane, diphenoxydiethoxysilane, benzyloxytrimethoxysilane, benzyloxytriethoxysilane, dibenzyloxydiemthoxysilane, dibenzyloxydiethoxysilane, phenylethyloxytrimethoxysilane, phenylethyloxytriethoxysilane, diphenylethyloxydiemthoxysilane, diphenylethyloxydiethoxysilane, tolyloxytrimethoxyslane, tolyoxytriethoxysilane, ditolyloxytrimethoxysilane, ditolyoxytriethoxysilane, xylyloxytrimethoxysilane, xylyloxytriethoxysilane, dixylyl- oxydimethoxysilane, dixylyloxydiethoxysilane, p-ethylphenoxytrimethoxy- silane, p-ethylphenoxytriethoxysilane, di(p-ethylphenoxy) dimethoxysilane, di(p-ethylphenoxy) diethoxysilane, and the like.

Examples of organosilicon-containing substances, other than the above organosilicates which may be utilized include tetra-acetoxysilane, diethoxydiacetoxysilane, and

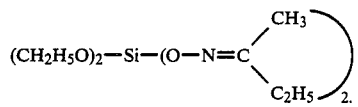

As will be further discussed infra, it should be understood that the organosilicates useful in preparing the silicon-containing polyols may be prepared by reacting an organosilicate as represented by formula I above, wherein x has the value 0, or a hydrolyzed organosilicate thereof, with a monohydric alcoholic or monohydric phenolic material so as to provide the required higher alkoxy, aryloxy, alkylaryloxy, arylalkyloxy, alkyloxyalkyloxy, and/or aryloxyalkyloxy moieties for the silicon-containing polyol.

Additionally, the organosilicon-containing substances useful in preparing the silicon-containing polyols may be prepared by reacting a tetrahalosilane such as tetrachlorosilane with a monohydric alcoholic or monohydric phenolic material so as to provide an organosilicon-containing material having higher alkoxy, aryloxy, alkylaryloxy, arylalkyloxy, alkyloxyalkyloxy, and/or aryloxyalkyloxy moieties, and also, optionally, with a lower alcohol to provide lower alkoxy moieties selected from the group consisting of methoxy, ethoxy and propoxy.

Hydrolyzed organosilicon-containing substances are organosilicon-containing substances which have been hydrolyzed in generally known manner. Generally, some of the hydrolysis products will be condensed to the corresponding siloxane materials. These siloxane materials contain compounds containing one or more siloxane linkages represented by the formula, II,

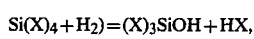 (II)

Usually these hydrolyzed and condensed organosilicon-containing substances are prepared in generally known manner by the hydrolysis of precursors which contain silicon atoms attached to substituents convertible to hydroxyl (i.e., silanol) groups. These hydrolysis reactions typically may be illustrated as, $$Si(X)_4 + H_2) = (X)_3SiOH + HX,$$

in which X can be an easily hydrolyzable group such as —OR[1],

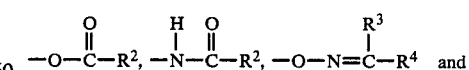 and

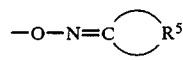

which groups are defined as above. The above silanol containing products often are condensed to produce one or more

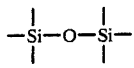

linkages in the hydrolyzed and condensed organosilicon-containing substances. Of course, it should be understood that organosilicon-containing substances which are hydrolyzed are intended to include those hydrolyzed materials prepared from precursors which contain silicon atoms attached to hydrolyzable substituents other than the hydrolyzable groups defined above (represented by X in the equation above) such hydrolyzable substituents include, for example, halogen such as chloro. Such hydrolyzed materials prepared from precursors which contain hydrolyzable halo substituents are substantially the same as those hydrolyzed materials prepared from precursors which contain silicon atoms attached to hydrolyzable groups X defined above, inasmuch as both types of precursors when hydrolyzed from silanol groups which can be condensed to form siloxane linkages.

It is also to be understood that mixtures of the organosilicon-containing substances and hydrolyzed organosilicon-containing substances may be used as the organosilicon-containing material for preparation of the silicon-containing polyol.

Some specific examples of hydrolyzed and condensed organosilicon-containing substances useful for preparing the silicon-containing polyols include hexaethoxy disiloxane, octaethoxy trisiloxane, and SILBOND-40, a hydrolyzed and condensed tetraethoxysilane available from Stauffer Chemical Company.

When a silicon-containing substance at least a portion of which is hydrolyzed is utilized in preparing the silicon-containing polyol, the degree of hydrolysis of the hydrolyzed organosilicon-containing substance can conveniently be considered to be that degree of hydrolysis required to convert at least 10 percent, preferably at least 20 percent, and most preferably at least 30 percent, by weight of the moieties directly bonded to Si which are displaceable, theoretically to form silanol groups

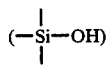

regardless of the actual degree of condensation of the silanol groups. For example, if tetraethylorthosilicate represent the silicon-containing substance, a degree of hydrolysis of 10 percent would mean that at least 10 percent by weight of the ethoxy moieties of the tetraethylorthosilicate could be thought to be theoretically converted to silanol groups regardless of the actual degree of condensation to siloxane containing compounds in the hydrolyzed product. Additionally, compounds or a mixture of compounds containing siloxane linkages in sufficient amounts to be considered to have been prepared theoretically from unhydrolyzed silicon-containing substances as defined herein, to at least 10 percent, preferably at least 20 percent, and most preferably at least 30 percent degree of hydrolysis as defined above, regardless of the actual manner of preparation, are understood to fall within the definition of an organosilicon-containing substance at least a portion of which is hydrolyzed.

An advantage of utilizing such silicon-containing polyols is that they can be prepared from organosilicon-containing materials containing a high proportion (e.g., from 50 to 100 percent by weight) of the silicon-containing substances described previously, which silicon-containing polyols can be employed to provide coating compositions of the invention which cure surprisingly with substantial retention of the organic portion of the silicon-containing polyol to films having desirable properties, for example, resistance to degradation by water and solvents. For example, silicon-containing materials having from 50 to 100 percent by weight based on the total weight of silicon-containing material or organosilicate corresponding to formula I above, hydrolyzed organosilicate, or mixture thereof, which silicon-containing polyols can be employed to provide coating compositions of the invention which surprisingly cure with substantial retention of the organic portion of the silicon-containing polyol to films having desirable properties such as water and solvent resistance.

Optionally, the organosilicon-containing material for the preparation of the silicon-containing polyol optionally may comprise an organosilicon material selected from a nonfunctional organosilane, a partially hydrolyzed nonfunctional organosilane or a mixture thereof as well as cohydrolyzed products of the organosilicon material and the organosilicon-containing substance. These organosilicon materials can be utilized to help provide hydrophobicity to the organosilicon-containing material where desired. When the organosilicon-containing material does comprise such organosilicon material, the amount of such organosilicon material generally ranges from greater than 2 to less than 80 percent, preferably less than 50 percent, and most preferably less than 25 percent, by weight of the organosilicon-containing material. As used herein, a nonfunctional organosilane is understood to mean a material corresponding to the formula, III, $$\begin{array}{c} R^8_m \\ | \\ Si-X_{4-m}, \end{array} \quad (III)$$

wherein
R$^8$ represents hydrogen, alkyl, aryl, alkylaryl, arylalkyl, alkyloxyalkyl, or aryloxyalkyl;
X represents —OR$^1$,

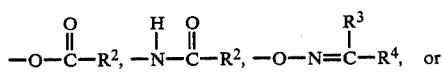

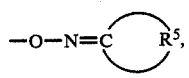

wherein
R$^1$ represents C$_1$–C$_3$ alkyl,
R$^2$ represents H or C$_1$–C$_4$ alkyl,
R$^3$ and R$^4$ independently represent H, C$_1$–C$_4$ alkyl, C$_6$–C$_8$ cycloalkyl, or C$_6$–C$_8$ aryl,
R$^5$ represents C$_4$–C$_7$ alkylene, and
m is an integer ranging from 1 to 3, preferably 2 or 3, and most preferably 1.

It should be understood that the term "nonfunctional organosilane" wherever appearing herein is used for convenience to distinguish compounds corresponding to the above formula, III (or the hydrolysis products thereof) from those compounds (or the hydrolysis products thereof) referred to herein for convenience as functional organosilanes and corresponding to the formulas IV infra. Thus, although moieties defined by X in formula III are considered to be easily displaceable by reaction with water and/or alcohol and are therefore necessarily rather reactive, they are not defined herein as "functional" as this word is used in connection with the definition of a "functional organosilane" infra.

Typically, when a nonfunctional organosilane (or a hydrolysis product thereof) is utilized as part of the organosilicon-containing material (component B), a nonfunctional organosilane corresponding to formula III in which X corresponds to —OR₁ as defined above is employed.

Examples of nonfunctional organosilanes corresponding to the above formula, III, include trimethoxymethylsilane, dimethoxydimethylsilane, methoxytrimethylsilane, triethoxymethylsilane, diethoxydimethylsilane, ethoxytrimethylsilane, dimethoxydiphenylsilane, diethoxydiphenylsilane, diethoxymethylphenylsilane, ethoxydimethphenylsilane, methoxydimethylpehnylsilane, ethoxytripropylsilane, diethoxydipropylsilane, dimethoxydipropylsilane, and the like. Additional examples of the nonfunctional organosilanes include amyltriethoxysilane the triethoxysilane. Mixtures of nonfunctional organosilanes also may be used as the optional organosilicon material.

Such organosilicon materials contribute to water resistance, toughness, and stain resistance of cured films prepared from compositions of the invention incorporating these organosilicon materials (and/or hydrolysis products thereof). Trialkoxysilanes corresponding to formula III above (i.e., m equals 1 and X represents —OR¹) are preferred, those in which R⁸ represents hydrogen, methyl, ethyl, or phenyl being most preferred. These trialkoxysilanes are especially preferred when such organosilicon materials are employed because of the balance they provide among hydrophobicity, availability, and ease of reaction with the hydrophobic polyol and/or higher monohydric alcohol. However, the dimethyldialkoxysilanes corresponding to formula III above are less desirable than the trialkoxysilanes since it is believed that the dimethyldialkoxysilanes tend to decrease adhesion to the substrate of cured films prepared from compositions of the invention incorporating the dimethyldialkoxysilanes. The monoalkoxysilanes corresponding to formula III above (i.e., m equals 3 and X represents —OR₁) may be utilized in controlled amounts in the preparation of the silicon-containing polyols and adjust the average functionality of the resultant silicon-containing polyol product.

When a mixture containing trialkoxysilanes and dialkoxysilanes is employed as the optional organosilicon material, the moles of trialkoxysilane to moles of dialkoxysilane can vary to give desirable properties. The average functionality based on lower alkoxy moieties of a mixture containing the organosilicon-containing substance and nonfunctional organosilanes useful as the optional organosilicon material for preparation of the silicon-containing polyol excluding the contribution to lower alkoxy moieties by any monoalkoxysilane which may be present in the mixture generally is less than 3.3 and preferably is less than 2.7. For example

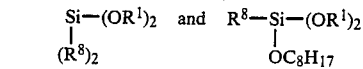

would represent difunctional compounds with respect to the lower alkoxy moieties —OR¹. The —OC₈H₁₇ group for example (which can be present in the nonfunctional organosilane as discussed in the following paragraph) would not contribute to the aforesaid average functionality.

Where desired, a nonfunctional organosilane, hydrolyzed nonfunctional organosilane, or mixture thereof, containing higher alkoxy, aryloxy, alkylaryloxy, arylalkyloxy, alkyloxyalkyloxy, and/or arloxyalkyloxy moieties as defined previously may be used as the optional organosilicon material. The organosilicon materials containing such moieties are believed to contribute to water resistance of cured films which may be prepared from compositions of the invention incorporating these organosilicon materials. Organosilicon materials containing such moieties may be prepared, for example, by reacting a non-functional organosilane, hydrolyzed nonfunctional organosilane, or a mixture thereof, with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the organosilane. Examples of such monofunctional organosilanes include: pentoxydimethoxymethylsilane, isopentoxydiethoxymethylsilane, 2-ethylhexoxydiethoxymethylsilane, phenoxydiethoxyphenylsilane, ethoxyphenoxydipropylsilane, benzyloxydiethoxymethylsilane, and the like. Mixtures of nonfunctional organosilanes containing such higher alkoxy, aryloxy, alkylaryloxy, arylalkyloxy, alkyloxyalkyloxy, and/or aryloxyalkyloxy moieties may be used as the optional organosilicon material.

Hydrolyzed nonfunctional organosilanes are organosilanes corresponding to the above formula, III, which have been hydrolyzed in known manner. Generally, some of the hydrolysis products are condensed to the corresponding siloxane materials which contain one or more siloxane linkages represented by formula II, above. Usually these hydrolyzed nonfunctional organosilanes are prepared in generally known manner similar to the preparation of the optional hydrolyzed organosilicon-containing substances such as the hydrolyzed organosilicates described above. Hydrolysis reactions for the preparation of hydrolyzed nonfunctional organosilanes may be illustrated as,

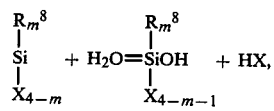

in which
R represents hydrogen, alkyl, aryl, alkylaryl, arylalkyl, alkyloxyalkyl, or aryloxyalkyl; and
X represents a hydrolyzable group as defined in formula III above; and
m is an integer ranging from 1 to 3.

The above silanol products are generally condensed to produce siloxane linkages in the hydrolyzed nonfunctional organosilanes. As for the hydrolyzed organosilicates described above, it should be understood that the phrase, "hydrolyzed nonfunctional organosilane" is intended to include those hydrolyzed materials prepared from precursors which contain silicon atoms attached to hydrolyzable substituents other than the hydrolyzable groups, above represented by X in formula III, such hydrolyzable substituents including, for example, halogen such as chloro.

It is also to be understood that mixtures of the optional nonfunctional organosilanes and hydrolyzed nonfunctional organosilanes optionally containing higher alkoxy, aryloxy, alkylaryloxy, arylalkyloxy, alkyloxyalkyloxy, and/or aryloxyalkyloxy moieties, may be utilized as part of the organosilicon-containing material for preparation of the silicon-containing polyols.

Optionally, the organosilicon-containing material (component B) may comprise a functional organosilane. When the organosilicon-containing material does comprise such functional organosilane, the amount of such functional organosilane generally ranges from greater than 2 to less than 50 percent, preferably less than 30 percent, and most preferably less than 15 percent, by weight of the organosilicon-containing material. As used herein, a "functional organosilane" is intended to include materials corresponding to the following formula, IV, $$Y-G-SiX_3, \qquad (IV)$$

wherein

G represents an organo group containing from 2 to 12 carbon atoms,

X represents—$OR^1$, 

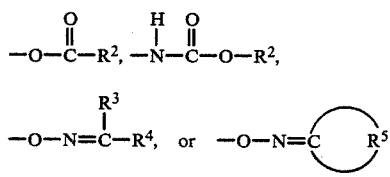

wherein $R^1$ represents $C_1$-$C_3$ alkyl, $R^2$ represents H or $C_1$-$C_4$ alkyl, $R^3$ and $R^4$ independently represent H, $C_1$-$C_4$ alkyl, $C_6$-$C_8$ cyloalkyl or $C_6$-$C_8$ aryl;

$R^5$ represents $C_4$-$C_7$ alkylene, and

Y represents an amino, epoxy, mercapto, isocyanato, uriedo, a group corresponding to

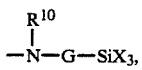

or a group corresponding to —$SiX_3$ wherein $R^{10}$ represents H or $C_1$-$C_4$ alkyl and G and X are as defined above.

In accordance with the discussion of the distinction between nonfunctional organosilanes and functional organosilanes as these terms are used herein, groups defined by Y above are considered to be the "functional" groups encompassed by the term "functional organosilane." Some examples of functional organosilanes include gamma-aminopropyltriethoxysilane, beta-aminoethyltriethoxysilane, gamma-mercaptopropyltriethoxysilane, gamma-isocyanatopropyltriethoxy silane, and ureidopropyltriethoxysilane. It will be appreciated by those skilled in the art that functional organosilanes containing mutually reactive functional groups such as 1,2-epoxy and amino, or amino and isocyanato, etc., or groups defined by X above which are reactive with groups defined by X above, should be employed in controlled amounts to prepare the silicon-containing polyols so as to avoid gelation or high viscosity products.

It is to be understood that mixtures of hydrolyzed mixtures of (1) the organosilicon-containing substance, hydrolyzed organosilicon-containing substance or mixtures thereof optionally containing higher alkoxy, aryloxy, alkylaryloxy, arylalkyloxy, alkyloxyalkyloxy, and/or aryloxyalkyloxy moieties with, (2) the optional nonfunctional organosilanes, hydrolyzed nonfunctional organosilanes and mixtures thereof optionally containing higher alkoxy, aryloxy, alkylaryloxy, arylalkyloxy, alkyloxyalkyloxy, and/or aryloxyalkyloxy moieties, and (3) the optional functional organosilanes, hydrolyzed functional organosilanes and mixtures thereof may be employed as the organosilicon-containing material for preparation of the silicon-containing polyols.

Although the incorporation of the nonfunctional and/or functional organosilanes (and/or the hydrolysis and cohydrolysis products thereof) in the organosilicon-containing material may be desirable for some purposes, these materials tend to be costly. Surprisingly, it has been found that cured coating compositions of the invention having good properties may be prepared from the silicon-containing polyols wherein the amount of such nonfunctional and/or functional organosilanes has been minimized or even eliminated in the silicon-containing starting material for preparation of the silicon-containing polyol reaction product. For example, coating compositions of the invention which cure to films having good properties such as gloss, hardness, and water resistance may be prepared from reaction products wherein the organosilicon-containing material comprises from 50 to 100 percent by weight, based on the total weight of the organosilicon-containing material, of the organosilicon-containing substance, optionally at least a portion of which is hydrolyzed.

In a first method for preparing a silicon-containing polyol employing an essentially 2-step process, an organosilicate corresponding to formula I, above, wherein the value of x is 0, a hydrolyzed organosilicate thereof, or a mixture thereof, is first reacted with a monohydric alcohol so as to provide the higher alkoxy, aryloxy, alkylaryloxy, arylalkyloxy, alkyloxyalkyloxy, and/or aryloxyalkyloxy moieties to the silicon-containing material. Examples of such alcohols include: sec-butyl alcohol, 1-phenyl-1-ethanol, 2-butoxyethanol, 2-hexoxyethanol, triethylcarinol, 2-methyl-2-butanol, 1-pentanol, neopentyl alcohol, cyclohexanol, 2-methyl-2-hexanol, 2-ethyl-2-hexanol, 2-ehtyl-1-hexanol, 1-octanol, 2-octanol, 1-nonanol, 5-butyl-5-nonanol, isodecyl alcohol, 2-phenylethanol, and benzyl alcohol. Preferably anhydrous alcohols are employed for this purpose. Of the above monohydric alcohols, sec-butyl alcohol 2-ethyl-1-hexanol, cyclohexanol, and isobutyl alcohol are preferred.

The monohydric alcohol generally is mixed with the organosilicate, hydrolyzed organosilicate or mixture thereof at room temperature and reacted at a temperature ranging from about 70° C. to about 180° C. with the distillation and removal of the low boiling, volatile reaction product such as the volatile alcohol. Since, typically, the reactants are quite fluid, it is usually not necessary and usually preferable, not to include solvents in the reaction medium, particularly where it is desired in the second step to further react the resultant reaction product of the first step with the hydrophobic polyol to form a silicon-containing polyol for use in a high solids coating composition of the invention with other components optionally including an added organic solvent. A high solids coating composition typically contains at least 50 percent, preferably at least 60 percent, and most preferably at least 70 percent, by weight resin solids based on the weight of that portion of the composition including the reaction product and organic solvent but excluding the weights of pigments, fillers and the like which may be present in the coating composition. However, where desired, nonreactive solvents which are compatible with the reactants can be employed. Moreover, the product may be thinned with solvent.

Typically the reaction in the first step is carried out in a substantially moisture-free atmosphere under a blanket of nonreactive gas such as nitrogen because uncontrolled hydrolysis of the organosilicon-containing material is not desired and also to minimize water in the reaction product. Of course, it is to be understood that residual amounts of water as contained, for example, in commercially available alcohols, are tolerable even when it is desired to minimize hydrolysis of the organosilicon-containing material and water content in the reaction product of the first step. Moreover, it may be desirable to use a controlled amount of water in the reaction medium particularly where an organic orthosilicate is used as the organosilicon-containing material and hydrolysis of the organic orthosilicate is desired.

The reaction in the first step may be carried out with or without the use of a catalyst depending on the reactivity of the particular choice of reactants and also on whether or not it is desired to minimize the presence of catalyst in the first step. Minimization of the use of catalyst in the first step is advantageous particularly where it is desired to prepare a silicon-containing polyol essentially free of catalyst. However, where desired, the monohydric alcohol and organosilicon-containing material can be prepared utilizing catalysts, examples of which include: acids such as paratoluenesulfonic acid; tin-containing compounds such as butylstannoic acid, dibutyl tin oxide, and stannous octoate; titanates such as tetraisopropyltitanate and tetrabutyltitanate; and the like.

In the second step of the first method of preparing a silicon-containing polyol, the reaction product of the first step is mixed with hydrophobic polyol and reacted at a temperature ranging from 90° C. to about 220° C. with distillation and removal of the low boiling, volatile reaction product such as the volatile alcohol. Typically, the reaction is conducted in a substantially moisture-free atmosphere under a blanket of nonreactive gas such as nitrogen. However, where desired, the reaction may be carried out without the use of the blanket of nonreactive gas.

Anhydrous polyols are preferred as the hydrophobic polyol component when it is desired to minimize hydrolysis of the organosilicon-containing material and water content in the resultant silicon-containing polyol. Of course, it is to be understood that residual amounts of water as contained, for example, in commercially available polyester polyols which can be used in the preparation, are tolerable even when it is desired to minimize such hydrolysis during preparation of, and water content in, the silicon-containing polyol product.

As in the first step, the reaction in the second step may be carried out with or without the use of a catalyst. Catalysts such as those described above are useful catalysts in the second step also.

In a second method for preparing a silicon-containing polyol, the silicon-containing polyol is prepared in an essentially one step process. A suitable reaction vessel is charged at room temperature with the following components: an organosilicate corresponding to formula I above, wherein the value of x is 0, or a hydrolyzed organosilicate thereof, or a mixture thereof; a monohydric alcohol as described in the first method above; and the hydrophobic polyol. The components are reacted typically in a substantially moisture-free atmosphere under a blanket of a nonreactive gas such as nitrogen at a temperature ranging from about 90° C. to about 220° C. As in the two step method described above, the reaction typically is carried out without the use of a solvent although a compatible solvent as described above may be employed. Additionally, the one-step process may be performed with or without the presence of a catalyst of the type described previously and with or without a controlled amount of water. In this second method, consideration should be given to the relative reactivities of the hydroxyl moieties from the hydrophobic polyol and monohydric alcohol when selecting the particular hydrophobic polyol and monohydric alcohol such that the monohydric alcohol will be incorporated into the resultant product while at the same time avoiding gelation of the reaction mixture during preparation of the silicon-containing polyol.

In a third method for preparing a silicon-containing polyol, an organosilicate corresponding to formula I above, wherein the value of x is 0, a hydrolyzed organosilicate thereof, or a mixture thereof, is reacted in a first step with the hydrophobic polyol at a temperature ranging from about 90° C. to about 220° C. with the distillation and removal of the low boiling, volatile reaction product such as the volatile alcohol. Typically the reaction is conducted in a substantially moisture-free atmosphere under a blanket of a nonreactive gas such as nitrogen. As in the first method described above, the reaction may be carried out without the use of the blanket of nonreactive gas. Additionally, anhydrous polyols are preferred as the hydrophobic polyol component. However, as in the first method described above, residual amounts of water are tolerable even when it is desired to minimize hydrolysis of the organosilicon-containing material and water content in the silicon-containing polyol.

The reaction may be carried out with or without the use of a catalyst such as those described above.

In a second step of the third method for preparing the silicon-containing polyol, the reaction product from the first step is reacted with a monohydric alcohol so as to provide the requisite higher alkoxy, aryloxy, alkylaryloxy, arylalkyloxy, alkyloxyalkyloxy, and/or aryloxyalkyloxy moieties in the silicon-containing polyol. Examples of such monohydric alcohols are set forth in the discussion of the first method above. The monohydric alcohol generally is mixed with the reaction product from the first step at room temperature and reacted at a temperature ranging from about 90° C. to about 180° C. with the distillation and removal of the low boiling, volatile reaction product such as the volatile alcohol. As in the first method, it is usually not necessary and usually preferable not to include solvents in the reaction medium. However, where desired, solvents such as those discussed in the first method above can be employed. As in the second method, consideration should be given to the relative reactivities of the hydroxyl moieties from the hydrophobic polyol and monohydric alcohol.

Typically the reaction is conducted in a substantially moisture-free atmosphere under a blanket of a nonreactive gas such as nitrogen, although, where desired, the reaction may be carried out without the use of the blanket nonreactive gas. As in the first and second methods above, the reaction may be conducted with or without the presence of catalysts such as those described previously and with or without a controlled amount of water.

It should be understood that the reaction temperatures in the three methods discussed above for preparing silicon-containing polyols are given for preparations in which the organosilicate, hydrolyzed and condensed organosilicate or mixture thereof contains lower alkoxy moieties for reaction with the hydroxyl moieties on the alcohols. However, when an organosilicate corresponding to formula I in which the value of x is 4, and/or hydrolyzed organosilicate containing, for example, less than about 8 percent by weight of lower alkoxy moieties comprises the silicon-containing material, the reaction temperatures will be correspondingly higher alkoxy, aryloxy, alkylaryloxy, arylalkyloxy, alkyloxyalkyloxy, and/or aryloxyalkyloxy moieties react less readily with the hydroxyl moieties of the alcohols than do the lower alkoxy moieties.

Regardless of the specific manner in which the silicon-containing polyol is prepared from an organosilicon-containing substance containing lower alkoxy moieties, the amounts by weight of the hydrophobic polyol and organosilicon-containing material generally are selected so that when the reaction for the preparation of the silicon-containing polyol is complete, the ungelled silicon-containing polyol product will contain less than 1 milliequivalent per gram based on the silicon-containing polyol reaction product of residual lower alkoxy moieties.

The amounts by weight of the hydrophobic polyol, organosilicon-containing material, and higher monohydric alcohol for preparation of silicon-containing polyol may vary. In general, regardless of the particular choice of organosilicon-containing material, hydrophobic polyol, and higher monohydric alcohol, and regardless of the specific manner in which the silicon-containing polyol is prepared, the ungelled silicon-containing polyol reaction product will have a content of hydroxyl groups from the hydrophobic polyol groups from the hydrophobic polyol ranging from 0.4 to 10, preferably from 0.7 to 7, and most prefarably from 1.3 to 6 milliequivalents per gram of the reaction product, a content of —OR groups (as defined previously) from the higher monofunctional alcohol ranging from 0.1 to 7, preferably from 0.2 to 6, and most preferably from 0.7 to 4.5 milliequivalents per gram of the reaction product, and a content of the moieties bonded directly to silicon which are displaceable by reaction with water and/or alcohol of less than 1 milliequivalent per gram of the silicon-containing polyol reaction product. Wherever used herein, 1 milliequivalent corresponds to 1 millimole.

Also, depending on the particular choices of hydrophobic polyol, organosilicon-containing material, and higher monohydric alcohol, the ratio of moles of hydroxyl moieties from the hydrophobic polyol to moles of the displaceable moieties bonded directly to Si to moles of hydroxyl moieties from the higher monohydric alcohol in the starting materials to produce homogeneous silicon-containing polyol reaction products which are not capable of gelling, according to the gel test described infra, will vary. However, a useful guide for choosing an appropriate mole ratio of starting materials is to choose the hydrophobic polyol, organosilicon-containing material, and higher monohydric alcohol so as to provide a ratio of moles of —OH moieties from the polyol to moles of displaceable moieties from the organosilicon-containing material to moles of —OH moieties from the higher monohydric alcohol respectively ranging from 7:4:0.5 to 3:4:2.5.

As stated previously, a silicon-containing polyol comprises a reaction product of the previously described starting materials which is homogeneous and ungelled. As will be appreciated by those skilled in the art of polymer science in general, an equation commonly referred to as the Flory equation has been used as a guideline to determine if a reaction mixture should gel, for example, given the number of moles of each of the reactive components, the number of reactive groups on each reactive component (i.e., the functionality of each component) and the desired theoretical extent of reaction (for example, 100 percent) of one of the reactive components. However, it has been found that the Flory equation does not provide a useful guideline for predicting whether a reaction mixture containing a polyol and organosilicon-containing material will gel or not, probably because of the tendency in siloxane chemistry for the formation, for example, of six and eight membered rings which is not taken into account in the Flory equation.

Therefore, the following simple procedure is given for determining whether a silicon-containing polyol prepared from hydrophobic polyol, silicon-containing material and monohydric alcohol will gel. If the product does gel as determined by the following procedure, it is considered not to be suitable for use in a coating composition of the present invention.

(Step 1) A 10-gram sample of the homogeneous silicon-containing polyol reaction product is introduced into a 2-ounce glass jar (about 15 centimeters high by 7.5 centimeters in diameter). The jar is covered with a cap lined with aluminum foil. A pinhole is punched in the cap and then covered with a piece of masking tape. Next, the jar and its contents are heated in an oven at 350° F. (177° C.) for 240 minutes. Thereafter, the jar is removed from the oven and tilted while still at essentially oven temperature. A gelled product will not flow whereas an ungelled product will flow like a liquid at oven temperature. If the product is gelled at the end of step 1, the product is considered not to be a silicon-containing polyol suitable for a coating composition of the invention. If the product has not gelled by the end of step 1, step 2 is performed on the ungelled product on which step 1 has already been performed. Step 2 is the same as step 1 except that 0.5 grams of stannous octoate is introduced into the sample before the procedure of step 1 is repeated. If the product is gelled at the end of step 2, it is considered not to be a silicon-containing polyol suitable for a coating composition of the invention.

The following procedure is offered as one procedure for determining the residual amount of lower alkoxy moieties in a silicon-containing polyol reaction product containing a small amount of residual lower alkoxy moieties. The product is analyzed for free alcohol content. Ten grams of the reaction product is mixed with 50 grams of a monohydric alcohol having a high boiling point, such as n-octyl alcohol, and 3 grams of stannous octoate. The resulting mixture is heated at 170° C. in an oil bath and the low boiling alcohols are removed by distillation. This operation may last up to three hours. The resulting distillate is analyzed by gas chromatography to determine the selected proportions of the lower boiling alcohols. From the weight of the distillate, its composition, and the free alcohol content of the sample, one can readily determine the moles of lower alkoxy moieties per gram of reaction product. The moles of lower alkoxy moieties per gram of reaction product can be converted to a percent by weight of lower alkoxy moieties based on the weight of reaction product or alternatively to milliequivalents of lower alkoxy moieties per gram of reaction product.

The following procedure is used herein to determine the percent by weight of solids in a silicon-containing polyol reaction product. A 0.5 gram sample of product is weighed onto an aluminum tray. The tray containing the sample is placed in a desiccator at 150° F. (65.6° C.) under a vacuum of 1 torr for 16 hours. The tray containing the sample is allowed to cool to room temperature under the vacuum and then reweighed. The percent by weight solids is calculated as the weight of the sample after the 16-hour heating procedure described above divided by the weight of the sample before the heating procedure times 100. For a less accurate determination of the percent by weight solids content of a resin than that described immediately above, a larger sample (for example, 5 grams) is distilled at 150° F. (65.6° C.) under a vacuum of 1 torr for 3 hours. The percent by weight solids content is calculated as the weight of the residue after heating divided by the weight of the sample before heating times 100.

Using the procedure for determining the percent by weight solids described above, the volatility of a silicon-containing polyol reaction product also can be determined. Reaction products characterized as having "low volatility" exhibit a minimum of 50 percent by weight retention of organosilicon-containing material based on the weight of organosilicon-containing material in the product before and after the above percent by weight solids determination. Preferred products show a 60 percent by weight retention, and most preferred products show a 70 percent by weight retention.

The hydroxyl value, and therefore, the hydroxyl equivalent weight, of a silicon-containing polyol can be determined by generally known procedures.

Generally, the silicon-containing polyols may have a wide range of viscosities. Typically, the silicon-containing polyols have hydroxyl equivalent weights ranging from about 200 to about 2,000. The viscosities of the silicon-containing polyols as measured at 25° C. with a Brookfield viscometer generally range from about 50 centipoise for (neat) reaction products without any added solvent or diluent up to about 5,000 centipoise for reaction products to which up to 20 percent by weight, based on the weight of the silicon-containing polyol reaction product, of a suitable solvent or diluent has been added. An advantage of the silicon-containing polyols is that they usually have low viscosities relative to their molecular weights. Because of the relatively low viscosities of silicon-containing polyols compared to those of generally known, conventional polyols of comparable hydroxyl equivalent weight, the silicon-containing polyols are particularly useful in high solids coating compositions of the invention. The silicon-containing polyols which are preferred for high solids coating applications typically have Brookfield viscosities at 25° C. in the absence of any added solvent or diluent (i.e., neat) ranging from about 50 to about 5,000 centipoise, most preferably from about 500 to about 4,000 centipoise.

The silicon-containing polyols generally are very storage stable. The low residual content of moieties directly bonded to Si which are displaceable by reaction with water and/or alcohol in the silicon-containing polyol is believed to contribute to their good storage stability. Thus, silicon-containing polyols generally can be stored at room temperature for long periods without requiring special conditions for the prevention of moisture, such as ordinary atmospheric moisture, from contacting the silicon-containing polyol.

However, where it is contemplated to store the silicon-containing polyols at temperature greater than about 140° C. (60° C.), it may be desirable to prevent the introduction of moisture into the silicon-containing polyol. For this purpose, the silicon-containing polyols may be stored in airtight containers with or without dry nitrogen. Also, compatible materials which easily hydrolyze to act as scavengers for water may be combined with the silicon-containing polyols. Examples of such easily hydrolyzable compatible materials include ethylorthoformate and 2,2-dimethoxy propane.

Although the silicon-containing polyols generally are not self-curable in the presence of moisture at about room temperature, they may be forced to self-cure at high temperatures, for example, above about 350° F. (177° C.), in the presence of moisture and a suitable catalyst. Examples of such catalysts include paratoluenesulfonic acid, dibutyltin dilaurate and tetraisopropyl titanate. Thus, the silicon-containing polyols may be used as moisture curable coating materials where, for example, energy considerations are not considered to be an important economic factor in the curing process.

A coating composition of the invention comprises the silicon-containing polyol and a curing agent for the silicon-containing polyol. Examples of suitable curing agents include: aminoplast resins, phenoplast resins, blocked or semi-blocked polyisocyanates, lower-alkoxy containing silanes and hydrolyzed lower-alkoxy containing silanes, and the reaction products prepared from organosilicon-containing materials and hydrophobic polyols which reaction products are the subjects of applicants' U.S. Pat. Nos. 4,467,081, 4,501,872 and 4,446,292, all three of said patents having been filed on the same date as the parent of the present application, the disclosures of which patents are hereby incorporated by reference in their entireties.

Aminoplast resins refer to the generally known condensation products of an aldehyde with an amino- or amido-group containing substance. Examples of suitable aminoplast resins for coating compositions of the invention include the reaction products of formaldehyde, acetaldehyde, crotonaldehyde, benzaldehyde and mixtures thereof with urea, melamine or benzoquanimine. Preferred aminoplast resins include the etherified products obtained from the reaction of alcohols and formaldehyde with melamine, urea, or benzoquanimine. Examples of suitable alcohols for making these etherified products include: methanol, ethanol, propanol, butanol, hexanol, benzylalcohol, cyclohexanol, 3-chloropropanol, and ethoxyethanol. Particularly preferred aminoplast resins are etherified melamine formaldehyde resins. Additional examples of suitable aminoplast resins are described in U.S. Pat. No. 4,075,141.

Phenoplast resins as used herein refer to the generally known condensation products of an aldehyde with a phenol. Suitable aldehydes include, for example, those previously described with reference to aminoplast resins. Preferred aldehydes are formaldehyde and acetaldehyde. Examples of suitable phenols for making the phenoplast resins include, for example, phenol per se, cresol, p-phenylphenol, P-tert-butylphenol, p-tert-amylphenol and cyclopentylphenol. Examples of additional phenoplast resins are described in U.S. Pat. No. 4,075,141.

Blocked and/or semi-blocked polyisocyanates are generally known. The blocked and/or semi-blocked isocyanates which are useful in the compositions of the invention include any organic polyisocyanate in which all or a portion of the isocyanate groups have been reacted with a blocking agent. In the preparation of the blocked or semi-blocked polyisocyanate, any suitable organic polyisocyanate may be used, examples of which include: trimethylene, tetramethylene, 1,2-propylene, 1,2-butylene and butylidene diisocyanates; 1,3-cyclopentane, 1,4-cyclohexane, and 1,2-cyclohexane diisocyanates; m-phenylene and 1,4-naphthalene diisocyanates; 4,4'-diphenylmethane diisocyanate; 2,4- or 2,6-toluene diisocyanates and mixtures thereof; and known organic polyisocyanate prepolymers derived from the reaction of a polyol such as a polyether or polyester polyol with excess polyisocyanate. Additional examples of polyisocyanates useful in preparing blocked or semi-blocked isocyanates can be found in the discussion infra of polyisocyanates which may be used to prepare the low molecular weight, hydrophobic polyurethane polyols. Examples of suitable blocking agents include: butanol, phenol, ethanol, m-cresol, 2-methyl-2-propanol, benzenethiol, methylethylketoxime and the like. Further description of many suitable blocked isocyanates can be found in *The Chemistry of Organic Film Formers*, by D. H. Solomon, John Wiley and Sons, 1967, pages 216–217.

The lower-alkoxy-containing silanes (including hydrolyzed lower-alkoxy-containing silanes) are suitable as curing agents in compositions of the invention. As used in the present context, the term "lower alkoxy" refers to a moiety selected from the group consisting of methoxy, ethoxy, propoxy. Preferably the lower-alkoxy-containing silane material contains an average of at least 2 lower alkoxy moieties (which may be the same or different) per molecule. Typically, the lower-alkoxy-containing silanes useful as curing agents in compositions of the invention correspond with the following formula, V,

(V)

wherein
R$^9$ represents methyl, ethyl, or propyl, preferably methyl or ethyl;
Z represents alkyl, aryl, alkylaryl, arylalkyl, alkoxy containing at least 4 carbon atoms, aryloxy, alkylaryloxy, alkyloxyalkyloxy, or arylalkyloxy; and
t is an integer ranging from 0 to 2.

As stated above, the lower-alkoxy-containing silanes useful as curing agents in compositions of the invention include the hydrolyzed products thereof. Such hydrolyzed lower-alkoxy-containing silanes may be prepared in the same generally known manner as for preparing the hydrolyzed silicon-containing substances described infra. When lower-alkoxy-containing silanes comprise the curing agents in compositions of the invention, it is preferred to employ lower-alkoxy-containing silanes which are relatively nonvolatile at the curing temperatures of the compositions.

In coating compositions of the invention containing a silicon-containing polyol and a curing agent, the amount of silicon-containing polyol and curing agent may vary widely depending on the silicon-containing polyol, the type of curing agent and the intended use of the composition. Generally, coating compositions of the invention comprise from about 10 to about 90 percent by weight of silicon-containing polyol and from about 90 to about 10 percent by weight of curing agent based on the total weight of composition, preferably from about 25 to about 75 percent by weight of silicon-containing polyol and from about 75 to about 25 percent by weight of curing agent, and most preferably from about 30 to about 70 percent by weight of silicon-containing polyol and from about 70 to about 30 percent by weight of curing agent based on the total weight of the composition.

The silicon-containing polyols are particularly suitable in high solids coating compositions of the invention. As used herein, a high solids coating composition contains at least 50 percent by weight, preferably at least 60 percent by weight, and most preferably at least 70 percent by weight substantially nonvolatile solids based on the total weight of the composition.

Although it is preferred to minimize the content of organic solvent in compositions of the invention, where desired, generally known organic solvents may be included since the silicon-containing polyols generally are compatible with organic solvents. Examples of suitable solvents include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butylacetate; hydrocarbons such as xylene and toluene; and mixtures thereof.

The coating compositions of the invention described above are substantially clear compositions. However, various generally known pigments, dyes and additives such as flow control agents, flatting agents, surfactants, fungicides, mildewcides, etc., may be included in compositions of the invention.

The coating compositions may be applied to a wide variety of substrates using any suitable application technique such as brushing, spraying, dipping, roller coating, doctor blade coating, etc. Examples of suitable substrates include metal, wood, plastics, particleboard, and the like. Cured compositions of the invention may be used to provide coatings which are flexible, are resistant to organic solvents such as acetone, are water and humidity resistant, have a high degree of hardness, are scratch resistant, have a high degree of gloss, and have a high degree of adhesion.

Coating compositions of the invention containing curing agents can be cured at a wide range of temperatures depending on the curing agent. For example, the compositions in which an aminoplast is the curing agent typically may be essentially fully cured within 30 minutes at a temperature of about 121° C. or less. Of course, the use of higher temperatures would require shorter curing periods.

The following examples illustrate the invention and are not to be construed as limiting it to their details. All parts and percentages in the examples and throughout the specification are by weight unless specifically indicated otherwise. As used herein, "pbw" means "parts by weight".

EXAMPLE 1

(a) A reaction vessel equipped with heating mantle, distillation column, thermometer and stirrer is charged at room temperature with a reaction mixture containing 5,200 pbw of 2-ethyl-1-hexanol, 4,160 pbw of tetraethylorthosilicate, and 23.4 pbw of paratoluenesulfonic acid. The reaction mixture is heated over a period of 3 hours and 10 minutes to a temperature of 96° C. with the distillation and removal of 1,000 milliliters of distillate containing ethyl alcohol and thereafter is allowed to cool to room temperature. Next, the reaction mixture is heated over a period of 4 hours and 54 minutes to a temperature of 150° C. with the distillation and removal of 1,200 milliliters of distillate containing ethyl alcohol. Thereafter, heating is discontinued and the reaction product is allowed to cool to room temperature.

(b) A reaction vessel equipped with heating mantle, distillation column, thermometer and stirrer is charged at room temperature with a reaction mixture containing 2,256 pbw of the reaction product of part (a) immediately above and 1,728 pbw of 1,4-cyclohexane-dimethanol. The reaction mixture is heated over a period of 3 hours and 47 minutes to a temperature of 190° C. with the distillation and removal of 550 milliliters (430 grams) of distillate containing ethyl alcohol, the distillate having a density of 0.782 grams/milliliter. The resulting product is a silicon-containing polyol having a calculated hydroxyl equivalent weight of about 250, a viscosity at 25° C. of about 449 stokes, a solids content determined at 105° C. for 1 hour of about 57 percent by weight, and a calculated average molecular weight of about 500. The resulting product also has a calculated content of ethoxy moieties of about 0.71 milliequivalents per gram of reaction product which corresponds to about 3.2 percent by weight of ethoxy moieties based on the weight of the reaction product.

(c) A coating composition is prepared by mixing 2 pbw of the reaction product of part (b) immediately above, 1 pbw of CYMEL 303 (a mixture of 98 pbw of hexamethoxymethylol melamine and 2 pbw of methanol available from American Cyanamid Company), and 0.03 pbw of a 10 percent by weight solution of paratoluenesulfonic acid in isopropanol.

The coating composition is applied to a metal panel to a wet film thickness of about 3 mil ($7.6 \times 10^{-5}$ meter) and cured at 250° F. (121° C.) for ½ hour. The cured coating has a hardness of from B to 2B and withstands 100 double rubs with acetone.

Wherever used herein, hardness is determined by the following procedure. An EAGLE Turquoise Drawing Pencil (from BEROL Corporation) is sharpened and the point is sanded to provide a flattened surface. The flattened tip is scraped at about a 45° angle to the coating while strong downward pressure is applied to the pencil. The value for hardness represents the designation of the "lead" in the hardest EAGLE Turquoise Drawing Pencil which does not scratch the coating.

Wherever used herein, the number of double rubs is understood to mean the number of back and forth finger rubs across the coating with a cloth dipped in the indicated solvent. The number of double rubs indicated is the number that the cured coating can withstand before the substrate becomes visible through the coating.

EXAMPLE 2

This example illustrates a silicon-containing polyol cured with a hydrolyzed organosilicate.

(a) A hydrolyzed tetraethylorthosilicate is prepared as follows. 26.8 grams (1.49 moles) of deionized water is added at 25° C. with stirring to a solution containing 800 grams (3.85 moles) of tetraethylorthosilicate, 160 grams of a solution containing about 95 pbw of ethanol and about 5 pbw of water available as Filmex C from U.S. Industrial Chemicals Company, and 0.018 grams of aqueous 12 N hydrochloric acid. The resulting mixture is allowed to remain at 25° C. for 16 hours.

(b) A first composition is prepared by mixing 37.3 pbw of the hydrolyzed tetraethylorthosilicate of part (a) immediately above with 16 pbw of the silicon-containing polyol of part (b) of Example 1 above.

Next, a coating composition is prepared by mixing 10 pbw of the first composition and 1 pbw of a 10 percent by weight solution of paratoluenesulfonic acid in isopropanol.

The coating composition is applied to a metal panel to a wet film thickness of about 3 mil ($7.6 \times 10^{-5}$ meter) and cured at 250° F. (121° C.) for 30 minutes.

EXAMPLE 3

(a) A reaction vessel equipped with heating mantle, distillation column, thermometer and stirrer is charged at room temperature with a reaction mixture containing 2,256 pbw of the reaction product of part (a) of Example 1, 864 pbw of 1,4-cyclohexanedimethanol, and 708 pbw of 1,6-hexanediol. The reaction mixture is heated to a temperature of 187° C. over a period of 2 hours and 56 minutes with the distillation and removal of 618 milliliters (485 grams) of distillate containing ethyl alcohol, the distillate having a density of 0.785 gram/milliliter. Ths resulting product is a silicon-containing polyol having a solids content of 51 percent by weight, a viscosity at 25° C. of 20.5 stokes (2,050 centipoise), an acid value of 0.6, a hydroxyl equivalent weight of 272, and a calculated average molecular weight of about 500. The resulting product has a calculated content of ethoxy moieties of about 0.40 milliequivalents per gram of reaction product which corresponds to about 1.8 percent by weight of ethoxy moieties based on the weight of the reaction product.

(b) A dispersion is prepared containing 100 pbw of titanium dioxide pigment, 5 pbw of butanol, and 36.4 pbw of the silicon-containing polyol of part (a) immediately above.

Next, a coating composition is prepared by mixing 141.4 pbw of the dispersion, 32.4 pbw of the silicon-containing polyol of part (a) immediately above, 36.7 pbw of CYMEL 303, 5 pbw of xylene, 2.5 pbw of a 10 percent by weight solution of paratoluenesulfonic acid in isopropanol, and 38.4 pbw of a mixture of solvents (containing 90 pbw of xylene and 10 pbw of butanol). The coating composition has a sprayable viscosity of 68 seconds as determined using a No. 2 Zahn cup.

The coating composition is spray applied to a zinc phosphate treated steel panel to a wet film thickness of about 2.2 mil (7.6×10⁻⁵ meter) and cured at 275° F. (135° C.) for 15 minutes to produce a cured coating having an initial hardness of F. Next, the coating is subjected to the double rub test described above and withstands 100 double rubs with methylethyl ketone solvent with no visible evidence of deterioration.

What is claimed is:

1. An organic coating composition comprising:
I. a silicon-containing polyol comprising a reaction product prepared by reacting:
   (A) at least one hydrophobic polyol;
   (B) an organosilicon-containing material comprising
      (1) at least one organosilicon-containing substance free of functional groups attached directly to carbon and essentially free of alkali metal ions, having atoms bonded directly to Si, all of said atoms being selected from the group consisting of O, N, Cl and combinations thereof, said organosilicon-containing substance additionally having moieties directly bonded to Si which are displaceable by reaction with water and/or alcohol, wherein, optionally, at least a part of said organosilicon-containing substance is hydrolyzed to a compound or a mixture of compounds, said compound or mixture of compounds containing a residual amount of said moieties directly bonded to Si which are displaceable;
      (2) optionally a nonfunctional organosilane, a hydrolyzed nonfunctional organosilane, or a mixture thereof; and
      (3) optionally a functional organosilane, a hydrolyzed functional organosilane or a mixture thereof; and
   (C) at least one higher monofunctional alcohol corresponding to the formula R-OH wherein R represents alkyl of at least 4 carbon atoms, aryl, alkylaryl, arylalkyl, alkyloxyalkyl, or aryloxyalkyl;
wherein said reaction product has a content of hydroxyl groups from said polyol ranging from 0.4 to 10 milliequivalents per gram of said reaction product, has a content of groups RO— from said higher monofunctional alcohol ranging from 0.1 to 7 milliequivalents per gram of said reaction product, has a content of said moieties directly bonded to Si which are displaceable of less than 1 milliequivalent per gram of said reaction product and remains ungelled when subjected to a two-step gel test consisting of (1) heating a 10 gram sample of said reaction product at 177° C. for 240 minutes in a glass jar covered by a piece of masking tape, followed by repeating step 1 in the presence of 0.5 grams of stannous octoate; and
II. a curing agent for said silicon-containing polyol; wherein said coating composition is essentially free of elemental zinc and cures to an essentially organic coating.

2. The coating composition of claim 1 wherein said curing agent is selected from the group consisting of an aminoplast, a phenoplast, an isocyanate, a blocked isocyanate, a semi-blocked isocyanate, a lower-alkoxy-containing silane, and a hydrolyzed lower-alkoxy-containing silane.

3. The coating composition of claim 1 wherein said moieties of said silicon-containing polyol, which are directly bonded to Si and which are displaceable by reaction with water and/or alcohol, are easily displaceable moieties selected from the group consisting of

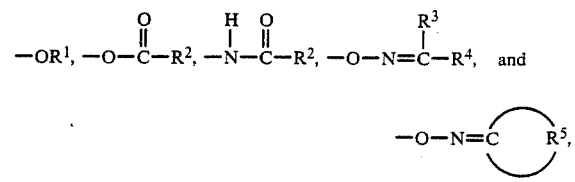

wherein
$R^1$ represents $C_1$-$C_3$ alkyl,
$R^2$ represents H or $C_1$-$C_4$ alkyl
$R^3$ and $R^4$ independently represent H, $C_1$-$C_4$ allyl, $C_6$-$C_8$ cycloalkyl, $C_6$-$C_8$ aryl, and
$R^5$ represents $C_4$-$C_7$ alkylene.

4. The coating composition of claim 1 wherein said atoms directly bonded to Si of said organosilicon-containing substance are oxygen atoms.

5. The coating composition of claim 1 wherein said moieties directly bonded to Si which are displaceable by reaction with water or alcohol are easily displaceable lower alkoxy moieties selected from the group consisting of methoxy, ethoxy and propoxy.

6. The coating composition of claim 1 wherein R in the formula for said groups RO— in said reaction product from said higher monofunctional alcohol represents alkyl of at least 4 carbon atoms.

7. The coating composition of claim 6 wherein R in the formula for said groups RO— in said reaction product from said monofunctional alcohol represents a branched alkyl group of at least 4 carbon atoms.

8. The coating composition of claim 1 wherein said atoms directly bonded to Si of said organosilicon-containing substance are oxygen atoms; said moieties directly bonded to Si which are displaceable by reaction with water and/or alcohol are easily displaceable lower alkoxy moieties selected from the group consisting of methoxy, ethoxy, and propoxy; and R in the formula for said groups RO— in said reaction product from said higher monofunctional alcohol represents a branched alkyl group of at least 4 carbon atoms.

9. The coating composition of claim 1 wherein at least a part of said organosilicon-containing substance is hydrolyzed by a compound or a mixture of compounds, said compound or mixture of compounds containing a residual amount of said moieties directly bonded to Si which are displaceable.

10. The coating composition of claim 1 wherein said hydrophobic polyol has a hydroxyl equivalent weight of from 45 to 1,000.

11. The coating composition of claim 1 wherein said hydrophobic polyol is a diol.

12. The coating composition of claim 1 wherein at least part of component (C) is included with component (B) prior to reaction with component (A).

13. The coating composition of claim 1 wherein said organosilicon-containing material comprises from 50 to 100 percent by weight of said organosilicon-containing substance based on the total weight of said organosilicon-containing material.

14. The coating composition of claim 1 wherein said organosilicon-containing material comprises from greater than 2 to less than 80 percent by weight based on the total weight of said organosilicon-containing material of a nonfunctional organosilane, a hydrolyzed nonfunctional organosilane, or a mixture thereof, and optionally from greater than 2 to less than 50 percent by weight based on the total weight of the organosilicon-containing material of a functional organosilane, a hydrolyzed functional organosilane, or a mixture thereof.

15. The coating composition of claim 14 wherein said organosilicon-containing material comprises a hydrolyzed mixture of at least a part of said organosilicon-containing substance; at least a part of said nonfunctional organosilane, hydrolyzed nonfunctional organosilane, or mixture thereof; and optionally, at least a part of said functional organosilane, hydrolyzed functional organosilane, or mixture thereof.

16. The coating composition of claim 1 wherein said hydrophobic polyol has a hydroxyl equivalent weight of from 59 to 600.

17. The coating composition of claim 1 additionally comprising an organic solvent, said composition containing at least 60 percent by weight substantially nonvolatile solids.

* * * * *